United States Patent
Minemura et al.

(10) Patent No.: US 9,555,833 B2
(45) Date of Patent: Jan. 31, 2017

(54) VEHICLE CONTROL APPARATUS AND VEHICLE PROVIDED WITH THE SAME

(71) Applicant: DENSO CORPORATION, Kariya, Aichi-pref. (JP)

(72) Inventors: Akitoshi Minemura, Kariya (JP); Masayoshi Takeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/471,335

(22) Filed: Aug. 28, 2014

(65) Prior Publication Data

US 2015/0066244 A1    Mar. 5, 2015

(30) Foreign Application Priority Data

Aug. 29, 2013  (JP) ................. 2013-178358

(51) Int. Cl.
    B62D 15/02    (2006.01)
(52) U.S. Cl.
    CPC ....... B62D 15/0265 (2013.01); B62D 15/0245 (2013.01)
(58) Field of Classification Search
    CPC .................. B62D 15/0265; B62D 15/0245
    See application file for complete search history.

(56) References Cited

U.S. PATENT DOCUMENTS

| 6,269,307 B1 | 7/2001 | Shinmura et al. | |
|---|---|---|---|
| 2011/0187515 A1* | 8/2011 | Saito | B60T 7/22 340/425.5 |

FOREIGN PATENT DOCUMENTS

| JP | 2000-066726 | 3/2000 |
|---|---|---|
| JP | 2000-221268 | 8/2000 |
| JP | 2004-034917 | 2/2004 |
| JP | 2004-136788 | 5/2004 |
| JP | 2005-008110 | 1/2005 |
| JP | 2007-084056 | 4/2007 |

OTHER PUBLICATIONS

Office Action mailed Jun. 23, 2015 in the corresponding Japanese application No. 2013-178358 with English translation.
Office Action mailed Oct. 27, 2015 in the corresponding Japanese application No. 2013-178358 with English translation.

* cited by examiner

Primary Examiner — Yuen Wong
(74) Attorney, Agent, or Firm — Harness, Dickey & Pierce, P.L.C.

(57) ABSTRACT

A vehicle control apparatus includes: a straight-ahead cruising determining unit that determines whether or not a vehicle is in a straight-ahead cruising state; a detecting unit that detects a target object that meets a predetermined condition related to at least either of a current positional relationship or a future predicted positional relationship with the vehicle, among objects ahead of the vehicle, when the vehicle is determined to be in the straight-ahead cruising state; an operation control unit that makes the vehicle perform a predetermined operation related to the detected target object; and a condition setting unit that sets the condition to be applied to the left side in relation to a center line of the vehicle to differ from the condition to be applied to the right side, based on a cruising trajectory of the vehicle.

15 Claims, 7 Drawing Sheets

VEHICLE CONTROL APPARATUS AND VEHICLE PROVIDED WITH THE SAME

CROSS-REFERENCE TO RELATED APPLICATION

This application is based on and claims the benefit of priority from earlier Japanese Patent Application No. 2013-178358 filed Aug. 29, 2013, the description of which is incorporated herein by reference.

BACKGROUND OF THE INVENTION

Field of the Invention

The present invention relates to a vehicle control apparatus and a vehicle provided with the vehicle control apparatus.

Description of the Related Art

Currently, pre-crash safety (referred to, hereinafter, as "PCS" (registered trademark)) is known that enables a vehicle to perform operations when an object (such as a preceding vehicle, an oncoming vehicle, or a guardrail) ahead of the vehicle is detected using a millimeter-wave radar or the like and the likelihood of a collision between the detected object and the vehicle is determined to be high. The operations that are performed are, for example, an operation to avoid collision (such as a warning or automatic braking) and an operation to reduce impact caused by a collision (such as automatic braking or automatic seatbelt retraction). PCS control requires a capability (referred to, hereinafter, as "ON capability") for applying control with certainty on an object with which the likelihood of collision is high. At the same time, PCS control also requires a capability (referred to, hereinafter, as "OFF capability") for suppressing unnecessary application of control on an object with which the likelihood of collision is low. In this way, two capabilities (ON capability and OFF capability) having a contradictory relationship are both required to be actualized at a high level in PCS control.

JP-A-2004-136788 describes that, to improve the capabilities of PCS control, the following is performed so that PCS control is less likely to be applied to an object positioned outside of a vehicle lane area in which the vehicle is traveling, compared to an object positioned within the vehicle lane area. That is, application conditions for PCS control are set differently depending on whether the position of the object is inside or outside the vehicle lane area. Alternatively, the application conditions for PCS control regarding an object positioned outside the vehicle lane area is determined based on the distance from a boundary line of the vehicle lane area to the object.

In general, even when the driver of a vehicle intends to perform straight-ahead cruising, the vehicle is rarely in a strict straight-ahead cruising state (a state in which the vehicle is traveling on a straight line). Most often, the vehicle is in a state in which the vehicle travels while slightly drifting to the left and right to an extent that the vehicle seems to be traveling straight ahead (apparent straight-ahead cruising state). The likelihood of a collision between each object ahead of the vehicle and the vehicle may be affected by the cruising trajectory that is the drifting of the vehicle. In the above-described conventional technology, such cruising trajectories of the vehicle are not taken into consideration. Therefore, even when the vehicle is in the apparent straight-ahead cruising state, the application conditions for PCS control remain unchanged. Therefore, the above-described conventional technology has room for improvement regarding improved capabilities of PCS control.

The above-described issue is not limited to PCS control. Rather, the issue is a common issue among vehicle control in which an object that meets predetermined conditions is detected from ahead of the vehicle and the vehicle is made to perform a predetermined operation related to the detected object. Such vehicle control includes, in addition to PCS, adaptive cruise control (referred to, hereinafter, as "ACC"), lane keep assist (referred to, hereinafter, as "LKA"), lane departure warning (referred to, hereinafter, as "LDW"), and the like.

SUMMARY

Hence it is desired to solve at least some of the above-described issues. Exemplary embodiments can be actualized as the following aspects.

According to an exemplary embodiment, a vehicle control apparatus is provided. The vehicle control apparatus includes: a straight-ahead cruising determining unit that determines whether or not a vehicle is in a straight-ahead cruising state; a detecting unit that detects a target object that meets a predetermined condition related to at least either of a current positional relationship or a future predicted positional relationship with the vehicle, among objects ahead of the vehicle, when the vehicle is determined to be in the straight-ahead cruising state; an operation control unit that makes the vehicle perform a predetermined operation related to the detected target object; and a condition setting unit that sets the condition to be applied to the left side in relation to a center line of the vehicle to differ from the condition to be applied to the right side, based on a cruising trajectory of the vehicle. In the vehicle control apparatus according to this aspect, even when the vehicle is in an apparent straight-ahead cruising state, the conditions to be applied to the left side and the right side can be set so that appropriate vehicle control is performed. Capabilities of vehicle control can be improved.

In the above-described vehicle control apparatus, the condition setting unit preferably sets the condition so that, when a current position of the vehicle is not on a trajectory straight line that approximates a past cruising trajectory of the vehicle, compared to a first condition that is the condition to be applied to the side in the direction towards the current position of the vehicle from the trajectory straight line in relation to the center line of the vehicle, a second condition that is the condition applied to the opposite side in relation to the center line of the vehicle is more relaxed. In the apparent straight-ahead cruising state, the possibility is considered to be high that an object that is present on the side opposite to the side in the direction towards the current position of the vehicle from the trajectory straight line in relation to the center line of the vehicle will subsequently be positioned in front of the vehicle. In the vehicle control apparatus according to this aspect, control can be applied with further certainty on such objects. Therefore, the capabilities of vehicle control can be further improved.

Not all of the plurality of constituent elements included in each aspect of the exemplary embodiment, described above, are essential. Some of the constituent elements among the plurality of constituent elements may be changed, omitted, switched with another new constituent element, and limiting details thereof may be partially omitted as appropriate to solve some or all of the above-described issues or achieve some or all of the effects described in the present specification. In addition, some or all of the technical features included in an aspect of the exemplary embodiment, described, above, may be combined with some or all of the technical features included in another aspect of the exemplary embodiment, described above, to form an independent aspect of the exemplary embodiment.

The exemplary embodiment can also be actualized by various aspects other than the vehicle control apparatus. For example, the exemplary embodiment can be actualized by aspects such as a vehicle control method, a vehicle control system, or a vehicle including a vehicle control apparatus or a vehicle control system.

DETAILED DESCRIPTION OF THE PREFERRED EMBODIMENTS

A. Embodiment

A-1. Configuration of a Vehicle

Figure 1:
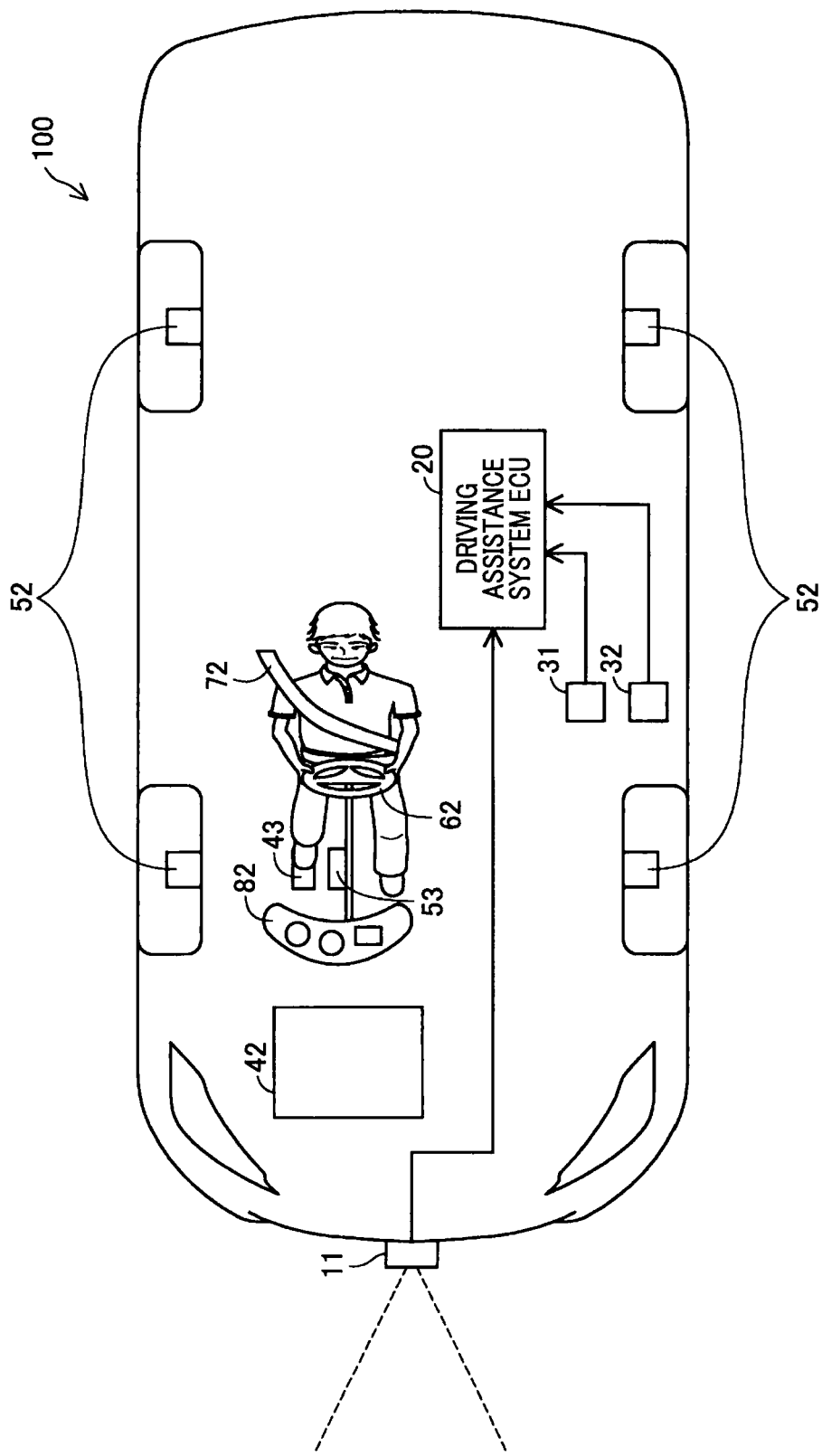
FIG. 1 is an explanatory diagram schematically showing a configuration of a vehicle according to an embodiment.
Figure 2:
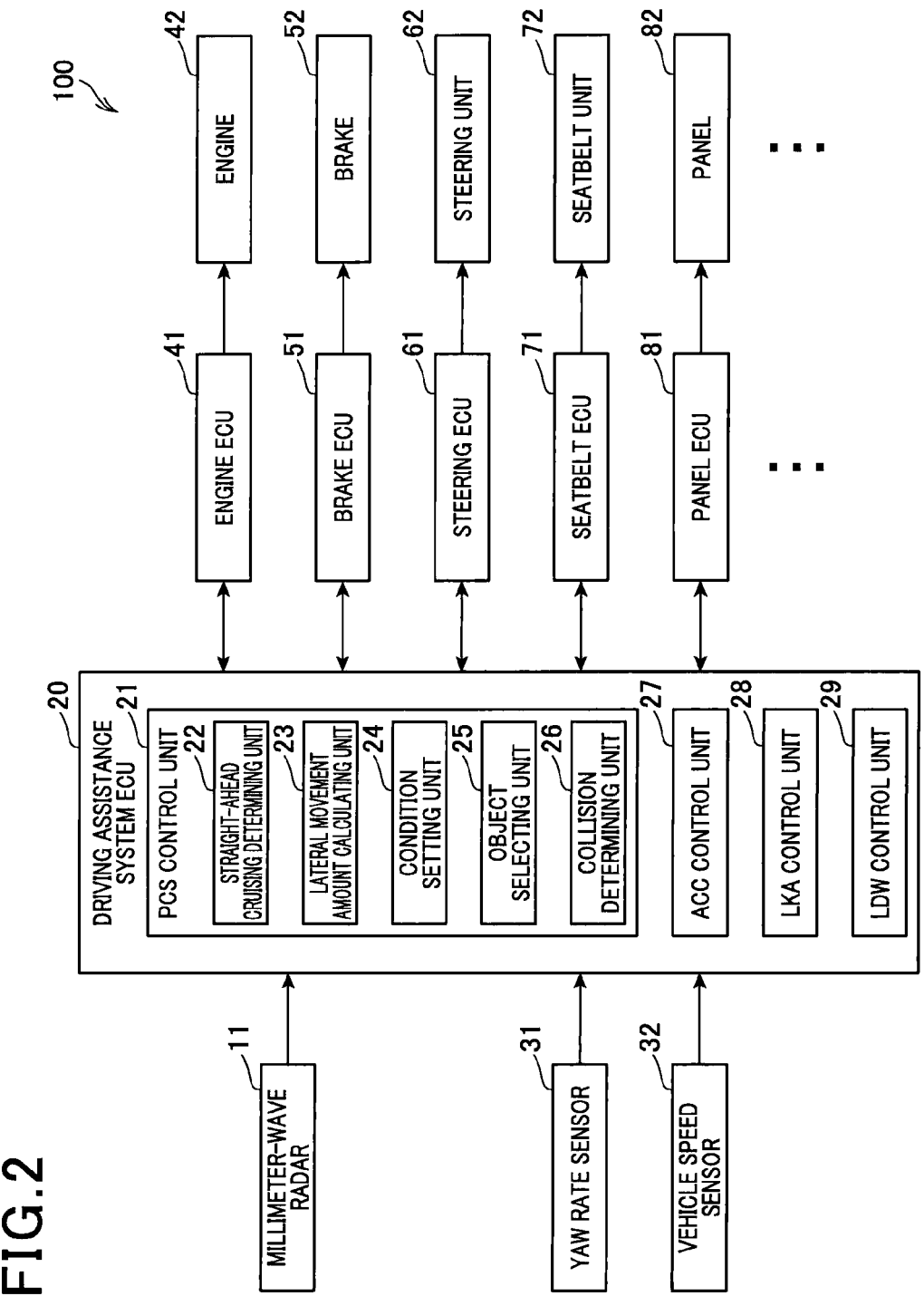
FIG. 2 is an explanatory diagram schematically showing a configuration of the vehicle according to the embodiment.

As shown in FIG. 1 and FIG. 2, a vehicle 100 according an embodiment of the present invention includes an engine 42, a brake 52, a steering unit 62, a seatbelt unit 72, and an instrument panel (referred to, hereinafter, as simply a "panel") 82. The engine 42 generates driving force of the vehicle 100. The brake 52 decelerates (stops) the vehicle 100. The steering unit 62 steers the vehicle 100. The seatbelt unit 72 restrains a passenger to a seat. The panel 82 indicates various types of information.

In addition, the vehicle 100 includes a millimeter-wave radar 11, a yaw rate sensor 31, and a vehicle speed sensor 32. The millimeter-wave radar 11 uses millimeter-wave band electromagnetic waves to detect whether or not an object (such as a preceding vehicle, an oncoming vehicle, or a guardrail) is present ahead of the vehicle 100. The millimeter-wave radar 11 also detects (when the object is present) the distance between the object and the vehicle 100, the orientation of the object from the perspective of the vehicle 100, and the relative speed of the object in relation to the vehicle. The yaw rate sensor 31 detects the yaw rate γ (turning angle velocity) of the vehicle 100. The vehicle speed sensor 32 detects the speed v of the vehicle 100. In the present specification, "ahead of the vehicle 100" refers to an area on the front side of a plane that passes through a front end point (or a rear end point) of the vehicle 100 and is perpendicular to the front/rear direction of the vehicle 100. "Ahead of the vehicle 100" is not limited to an area (such as a target area AA in state A in FIG. 5) within the width of the vehicle 100 in the horizontal direction (the left and right end points of the vehicle 100), within the area on the front side.

The vehicle 100 includes an engine electronic control unit (ECU) 41, a brake ECU 51, a steering ECU 61, a seatbelt ECU 71, a panel ECU 81, and a driving assistance system ECU 20. The engine ECU 41 controls the engine 42. The brake ECU 51 controls the brake 52. The steering ECU 61 controls the steering unit 62. The seatbelt ECU controls the seatbelt unit 72. The panel ECU 81 controls the panel 82. Each ECU has a central processing unit (CPU) and a storage area. The CPU runs a program stored in the storage area, thereby actualizing control by the ECU.

The driving assistance system ECU 20 acquires information from each sensor (the millimeter-wave radar 11, the yaw rate sensor 31, and the vehicle speed sensor 32). The driving assistance system ECU 20 then performs various types of control to assist in driving of the vehicle 100 based on the acquired information. The driving assistance system ECU 20 corresponds to a vehicle control apparatus in the claims.

The driving assistance system ECU 20 includes a PCS control unit 21. The PCS control unit 21 performs PCS control as one type of driving assistance control. PCS control enables, through the respective ECUs, the units of the vehicle 100 to perform operations when the likelihood of a collision between an object ahead of the vehicle 100 and the vehicle 100 is determined to be high. The operations performed by the units include an operation to avoid collision and an operation to reduce impact caused by a collision. Specifically, the PCS control unit 21 performs one or a plurality of types of control among the following types of control, based on whether the likelihood of a collision between the vehicle 100 and the object is high or low:

(1) control to automatically close a throttle valve of the engine 42 (regardless of the state of a throttle pedal 43);
(2) control to increase assistance hydraulic pressure in the brake 52 and improve responsiveness of the brake 52 to operation of a brake pedal 53;
(3) control to decelerate (stop) the vehicle 100 by automatically applying the brake 52 (regardless of the state of the brake pedal 53);
(4) control to perform automatic steering by the steering unit 62 so that the traveling direction of the vehicle 100 is changed to a direction in which collision with the object is avoided;
(5) control to vibrate the steering wheel of the steering unit 62 to warn the driver;
(6) control to reduce the movement of a passenger during a collision by automatically retracting the seatbelt of the seatbelt unit 72; and
(7) control to emit light or sound from the panel 82 to warn the driver.

The PCS control unit 21 includes, as functional units for performing the above-described PCS control, a straight-ahead cruising determining unit 22, a lateral movement amount calculating unit 23, a condition setting unit 24, an object selecting unit 25, and a collision determining unit 26. The functions of each unit will be described based on the flow of PCS control, described hereafter.

The driving assistance system ECU 20 also includes an ACC control unit 27 that performs ACC control, a LKA control unit 28 that performs LKA control, and a LDW control unit 29 that performs LDW control. In ACC control, while the vehicle 100 is controlled so as to maintain a preset speed, the vehicle 100 is decelerated when there is risk of the distance to a preceding vehicle detected by a sensor becoming shorter than a preset value. In LKA control, a lane marker on the road is detected using a sensor. The vehicle 100 is made to perform an operation to avoid lane departure when the vehicle 100 is determined to be likely to depart from the lane. In LDW control, when the vehicle 100 is similarly determined to be likely to depart from the lane, a warning is issued to the driver by light, sound, vibrations, or the like.

A-2. PCS Control Process

Figure 3:
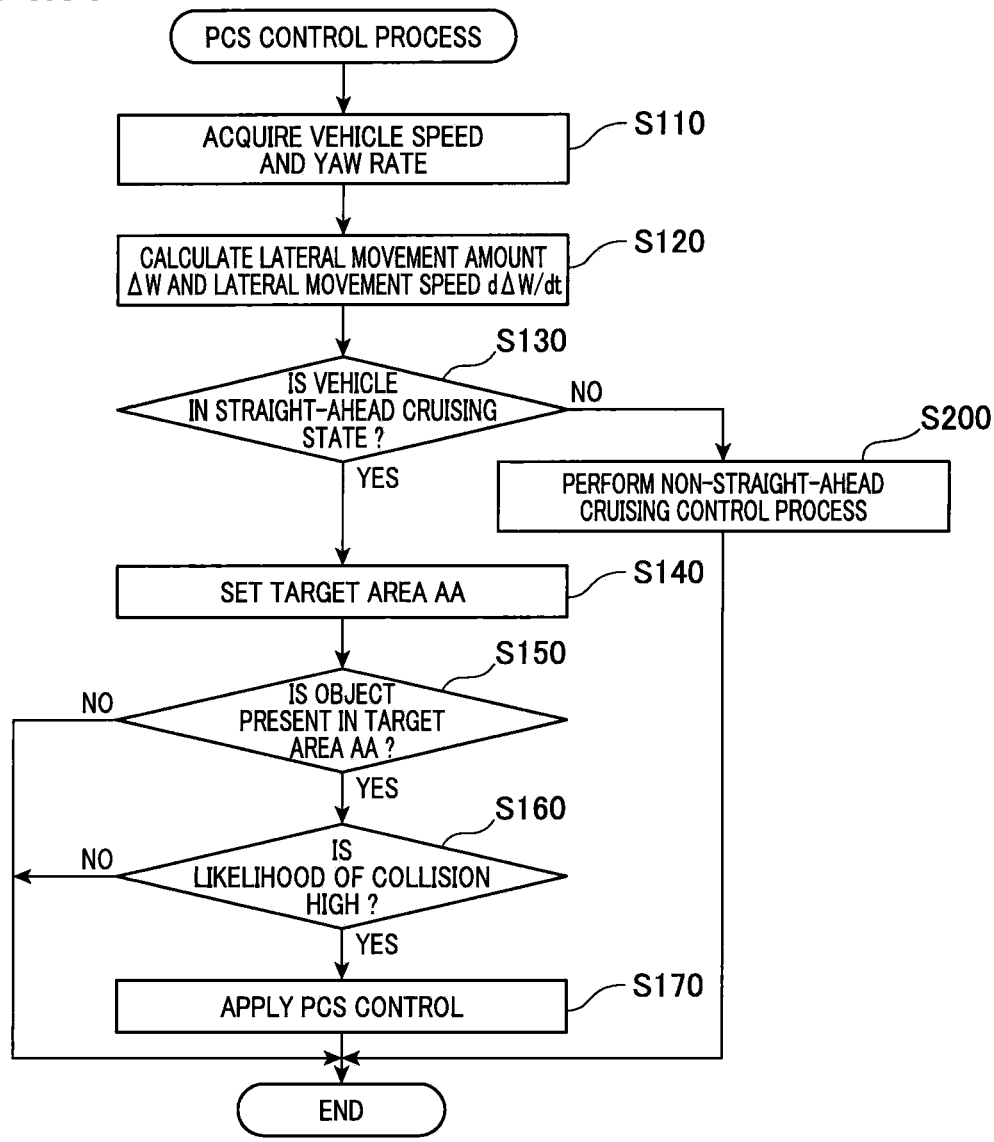
FIG. 3 is a flowchart of the flow of a PCS control process.

The PCS control unit 21 of the driving assistance system ECU 20 repeatedly performs the PCS control process shown in FIG. 3 during a period in which the ignition is ON. First, the PCS control unit 21 acquires the vehicle speed v and the yaw rate γ of the vehicle 100 detected by the vehicle speed sensor 32 and the yaw rate sensor 31 as information related to cruising of the vehicle 100 (Step S110).

Figure 4:
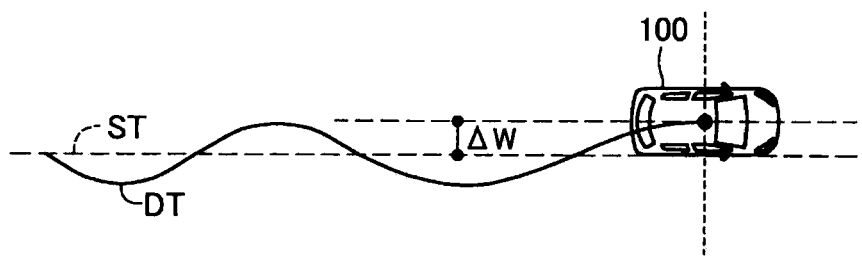
FIG. 4 is an explanatory diagram of a lateral movement amount ΔW of the vehicle.

Next, the lateral movement amount calculating unit 32 of the PCS control unit 21 calculates the lateral movement amount ΔW and the lateral movement speed dΔW/dt of the vehicle 100 (Step S120). As shown in FIG. 4, the lateral movement amount ΔW refers to the distance between a trajectory straight line ST and the current position (of the center point) of the vehicle 100. The trajectory straight line ST is a straight line that approximates the cruising trajectory DT of the vehicle 100 during a predetermined period in the past. In other words, the lateral movement amount ΔW refers to the amount of drifting of the vehicle 100 in the leftward direction or the rightward direction when the vehicle 100 is in the straight-ahead cruising state (a strict straight-ahead cruising state or an apparent straight-ahead cruising state). The lateral movement amount ΔW is calculated using expression (1), below, under a condition that the absolute value of the yaw rate γ is sufficiently small. In expression (1), b represents a predetermined sampling cycle. The lateral movement amount calculating unit 23 stores the speed v and the yaw rate γ during a fixed period in the past. The lateral movement amount calculating unit 23 then calculates the lateral movement amount ΔW using the stored speed v and yaw rate γ. The derivation of expression (1) used to calculate the lateral movement amount ΔW will be described hereafter. In addition, the lateral movement speed dΔW/dt is a time derivative of the lateral movement amount ΔW.

$$\Delta W = \int_{t}^{t+b} v \cdot \sin(\gamma) dt \approx \int_{t}^{t+b} v \cdot \gamma \, dt \qquad (1)$$

Next, the straight-ahead cruising determining unit 22 of the PCS control unit 21 determines whether or not the vehicle 100 is in the straight-ahead cruising state based on the calculated lateral movement amount ΔW and lateral movement speed dΔW/dt (Step S130). As described above, the "straight-ahead cruising state" includes the strict straight-ahead cruising state (a state in which the vehicle 100 is traveling on a straight line) and an apparent straight-ahead cruising state (a state in which the vehicle 100 is traveling while slightly drifting to the left and right to an extent that the vehicle 100 seems to be traveling straight ahead). According to the present embodiment, the straight-ahead cruising determining unit 22 determines that the vehicle 100 is in the straight-ahead cruising state when the lateral movement amount ΔW is less than 1.5 m and the lateral movement speed dΔW/dt is less than 1.5 m/s.

When determined that the vehicle 100 is in the straight-ahead cruising state (YES at Step S130), the condition setting unit 24 of the PCS control unit 21 sets a target area AA as one of the application conditions for PCS control (Step S140). The object selecting unit 25 determines whether or not an object is present in the target area AA (Step S150). The target area AA is an area within the radar irradiation area of the millimeter-wave radar 11 in which detection is performed for an object (referred to, hereinafter, as a "determination target object") that is subjected to collision likelihood determination (Step S160), described hereafter. In other words, among the objects detected by the millimeter-wave radar 11, an object that is present within the target area AA is selected as the determination target object. "The object is positioned within the target area AA", which is the condition for selecting the determination target object, can be said to be a condition related to the current positional relationship between the object and the vehicle 100.

Figure 5:
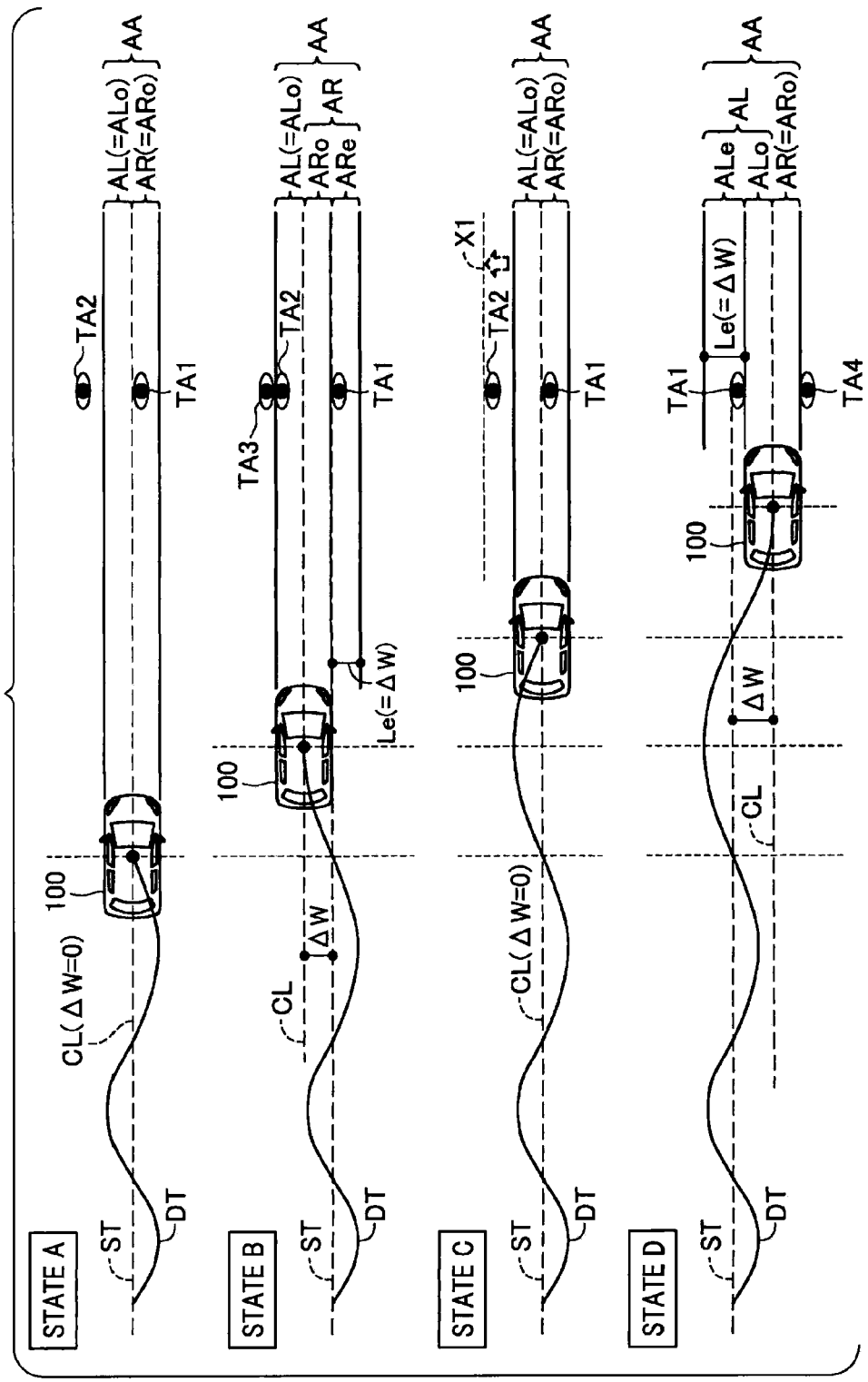
FIG. 5 is an explanatory diagram of a method for setting a target area AA based on a cruising trajectory of the vehicle.

As shown in FIG. 5, the target area AA is composed of a left-side area AL and a right-side area AR. The left-side area AL is positioned on the left side of a center line CL of the vehicle 100. The right-side area AR is positioned on the right side of the center line CL of the vehicle 100. The condition setting unit 24 sets the left-side area AL and the right-side area AR (or in other words, the target area AA) based on the relationship between the trajectory straight line ST and the current position of the vehicle 100.

In "state A" in FIG. 5, the position of the vehicle 100 is on the trajectory straight line ST (in other words, the lateral movement amount ΔW=0). In state A, the target area AA is set so that the width of the left-side area AL and the width of the right-side area AR are the same. The "width" of the target area AA and of each area configuring the target area AA refers to the size along the direction perpendicular to the trajectory straight line ST. The left-side area AL and the right-side area AR when the position of the vehicle 100 is on the trajectory straight line ST are respectively referred to as a left-side basic area ALo and a right-side basic area ARo. According to the present embodiment, the width of the target area AA composed of the left-side basic area ALo and the right-side basic area ARo is substantially the same as the width of the vehicle 100. The depth of the target area AA (the size along the trajectory straight line ST) may be the same as the depth of the object detectable area of the millimeter-wave radar 11 or shorter. In state A, an object TA1 that is positioned within the target area AA is selected as the determination target object. However, an object TA2 that is positioned outside of the target area AA is not selected as the determination target object (even if the object TA2 is detected by the millimeter-wave radar 11).

On the other hand, when the vehicle 100 moves from "state A" to "state B" in which the position of the vehicle 100 is to the left of the trajectory straight line ST, the target area AA is set so that the right-side area AR is wider than the left-side area AL. Specifically, the left-side area AL is the same as the left-side basic area ALo. However, the right-side area AR is composed of the right-side basic area ARo and a right-side extension area ARe. The right-side extension area ARe is adjacent to the outer side of the right-side basic area ARo. The width Le of the right-side extension area ARe is equivalent to the lateral movement amount ΔW. Therefore, as the lateral movement amount ΔW increases, the width of the right-side extension area ARe increases. As a result, the width of the right-side area AR increases. In state B, the object TA1 is not present within the right-side basic area ARo. However, the object TA1 is positioned within the right-side extension area ARe. Therefore, the object TA1 is selected as the determination target object. On the other hand, regarding the left side, the object TA2 that is positioned within the left-side area AL (the left-side basic area ALo) is selected as the determination target object. However, an object TA3 that is positioned slightly to the leftward outer side of the left-side area AL is not selected as the determination target object. In this way, when the position of the vehicle 100 on the left side of the trajectory straight line ST, the right-side area AR is set to be wider than the left-side area AL. Therefore, the condition for selecting an object positioned on the right side in relation to the center line of the vehicle 100 as the determination target object is more relaxed than the condition for selecting an object positioned on the left as the determination target object. The condition being (relatively) relaxed means that the condition is (relatively) easily met (cases in which the condition is met occur with relative frequency). In addition, because state B is a state in which the vehicle 100 has moved from state A, the trajectory straight line ST in state B is not necessarily the same as the trajectory straight line ST in state A. The same applies to the trajectory straight line ST in other states described hereafter.

When the vehicle 100 further moves from "state B" to "state C" in which the position of the vehicle 100 is on the trajectory straight line ST, in a manner similar to that in state A, the target area AA composed of the left-side basic area ALo and the right-side basic area ARo is set. In state C, the object TA1 that is positioned within the target area AA is selected as the determination target object. However, the object TA2 that is positioned outside of the target area AA is not selected as the determination target object.

When the vehicle 100 further moves from "state C" to "state D" in which the position of the vehicle 100 is to the right of the trajectory straight line ST, the target area AA is set so that the left-side area AL is wider than the right-side area AR. Specifically, the right-side area AR is the same as the right-side basic area ARo. However, the left-side area AL is composed of the left-side basic area ALo and a left-side extension area ALe. The left-side extension area ALe is adjacent to the outer side of the left-side basic area ALo. The width Le of the left-side extension area ALe is equivalent to the lateral movement amount ΔW. Therefore, as the lateral movement amount ΔW increases, the width of the left-side extension area ALe increases. As a result, the width of the left-side area AL increases. In state D, the object TA1 is not present within the left-side basic area ALo. However, the object TA1 is positioned within the left-side extension area ALe. Therefore, the object TA1 is selected as the determination target object. On the other hand, regarding the right side, an object TA4 that is positioned slightly to the rightward outer side of the right-side area AR (the right-side basic area ARo) is not selected as the determination target object. In this way, when the position of the vehicle 100 on the right side of the trajectory straight line ST, the left-side area AL is set to be wider than the right-side area AR. Therefore, the condition for selecting an object positioned on the left side in relation to the center line of the vehicle 100 as the determination target object (or candidate object) is more relaxed than the condition for selecting an object positioned on the left as the determination target object.

As described above, when the current position of the vehicle 100 is not on the trajectory straight line ST (state B or state D in FIG. 5), the condition setting unit 24 sets the condition for detecting (selecting) the determination target object to be more relaxed regarding the opposite side in relation to the center line CL of the vehicle 100 (the right side in state B and the left side in state D) compared to the side in the direction towards the current position of the vehicle 100 from the trajectory straight line ST in relation to the center line CL of the vehicle 100 (the left side in state B and the right side in state D).

When determined that an object is present in the target area AA (when the object selecting unit 25 selects the determination target object) (YES at Step S150), the collision determining unit 26 of the PCS control unit 21 performs collision likelihood determination regarding collision with the vehicle 100 for each determination target object (Step S160). Specifically, the collision determining unit 26 calculates a time-to-collision TTC based on the detection results from the sensors (such as the distance from the vehicle 100, the orientation from the perspective of the vehicle 100, and the relative speed in relation to the vehicle 100), for each determination target object. The time-to-collision TTC refers to the amount of time until a predicted time of collision between the vehicle 100 and the object. When the time-to-collision TTC is shorter than a first threshold Th1 that is set in advance, the collision determining unit 26 determines that the likelihood of a collision between the determination target object and the vehicle 100 is high. On the other hand, when the time-to-collision TTC is longer than the first threshold Th1, the collision determining unit 26 determines that the likelihood of a collision between the determination target object and the vehicle 100 is not high. The object selecting unit 25 and the collision determining unit 26 correspond to a detecting unit in the claims. In addition, "the time-to-collision TTC is shorter than the first threshold Th1", which is the condition for determining that the likelihood of collision is high, can be said to be a condition related to a future predicted positional relationship between the object and the vehicle 100.

When determined that the likelihood of a collision with the vehicle 100 is high regarding at least a single determination target object (YES at Step S160), the PCS control unit 21 performs at least one of the PCS controls (1) to (7) described above (Step S170). According to the present embodiment, the determination target object determined to have the highest likelihood of a collision with the vehicle 100 (in other words, having the shortest time-to-collision TTC) is selected as an object to be subjected to PCS control (referred to, hereinafter, as a "control target object"). The PCS control selected based on the time-to-collision TTC of the control target object is then performed. For example, when the time-to-collision TTC of the control target object is a second threshold Th2 (<first threshold Th1) or longer, control is performed to issue a warning to the driver using the steering unit 62 or the panel 82 (controls (5) and (7) described above). When the time-to-collision TTC of the control target object is shorter than the second threshold Th2, and a third threshold Th3 (<second threshold Th2) or longer, control is performed to improve the responsiveness characteristics of the brake 52 (control (2)). When the time-to-collision TTC of the control target object is shorter than the third threshold Th3, and a fourth threshold Th4 (<third threshold Th3) or longer, one or a plurality of the following is performed: control to close the throttle valve (control (1)), control to automatically apply the brake 52 (control (3)), collision avoidance control using the steering unit 62 (control (4)), and seatbelt automatic retraction control (control (7)). The PCS control unit 21 corresponds to an operation control unit.

When determined that an object is not present in the target area AA (NO at Step S150) or when determined that the likelihood of a collision with the vehicle 100 is not high for any of the determination target objects selected from the target area AA (NO at Step S160), the process is completed without PCS control being applied.

In addition, when determined that the vehicle 100 is not in the straight-ahead cruising state (in other words, when the lateral movement amount ΔW is 1.5 m or more, or the lateral movement speed dΔW/dt is 1.5 m/s or higher) (NO at Step S130), the PCS control unit 21 performs a non-straight-ahead cruising control process (Step S200). In the non-straight-ahead cruising control process, control similar to the above-described PCS control for when the vehicle 100 is determined to be in the straight-ahead cruising state is performed. However, when the PCS control is applied when the vehicle 100 is not in the straight-ahead cruising state under the same conditions (the target area AA and the thresholds related to the time-to-collision TTC) as those when the vehicle is in the straight-ahead cruising state, unnecessary control may be performed. Alternatively, necessary control may not be performed. Therefore, in the non-straight-ahead cruising control process, application conditions for PCS control that differ from those in the straight-ahead cruising state are used. The application conditions for PCS control in the non-straight-ahead cruising control process are set accordingly based on the required ON capability and OFF capability. In this way, according to the present embodiment, the conditions are set so that the application conditions for control differ between when the vehicle 100 is determined to be in the straight-ahead cruising state and when the vehicle 100 is determined not to be in the straight-ahead cruising state. Therefore, appropriate conditions can be set during straight-ahead cruising and non-straight-ahead cruising, depending on the required ON capability and OFF capability.

Here, under a presumption that the vehicle 100 is in the straight-ahead cruising state (strict straight-ahead cruising state and apparent straight-ahead cruising state), in state B in FIG. 5 in which the position of the vehicle 100 is to the left of the trajectory straight line ST, the possibility is high that the subsequent direction of lateral movement of the vehicle 100 is in the direction approaching the trajectory straight line ST (in other words, the rightward direction). Therefore, the possibility is high that an object that is present on the right side of the vehicle 100 will subsequently be present in front of the vehicle 100. The likelihood of a collision between the object and the vehicle 100 is considered to be high to a certain extent, i.e., to be moderately high. In a similar manner, in state D in FIG. 5 in which the position of the vehicle 100 is to the right of the trajectory straight line ST, the probability is high that the subsequent direction of lateral movement of the vehicle 100 is the direction approaching the trajectory straight line ST (in other words, the leftward direction). The probability is high that an object that is present on the left side of the vehicle 100 will subsequently be present in front of the vehicle 100. The likelihood of a collision between the object and the vehicle 100 is considered to be high to a certain extent.

As described above, according to the present embodiment, when the current position of the vehicle 100 is not on the trajectory straight line ST, regarding the side in the direction towards the current position of the vehicle 100 from the trajectory straight line ST in relation to the center line CL of the vehicle 100 (such as the left side in relation to the center line CL in state B), the same area as that when the position of the vehicle 100 is on the trajectory straight line ST is set as the area composing the target area AA (such as the left-side area AL being the same as the left-side basic area ALo in state B). On the other hand, regarding the opposite side in relation to the center line CL of the vehicle 100 (such as the right side in relation to the center line CL in state B), an area wider than that when the position of the vehicle 100 is on the trajectory straight line ST is set as the area composing the target area AA (such as an area that is the right-side extension area ARe added to the right-side basic area ARo being set as the right-side area AR in state B).

In this way, according to the present embodiment, when the position of the vehicle 100 is not on the trajectory straight line ST, the application conditions for PCS control are set to be more relaxed for the opposite side, compared to the side in the direction towards the current position of the vehicle 100 from the trajectory straight line ST in relation to the center line CL of the vehicle 100. Therefore, PCS control can be applied with further certainty on an object of which the likelihood of collision is high. The ON capability of PCS control can be improved. For example, in state B in FIG. 5, if the right-side area AR is set to be the same as the right-side basic area ARo, the object TA1 of which the likelihood of collision is high to a certain extent is not selected as the target object. However, according to the present embodiment, the area that is the right-side extension area ARe added to the right-side basic area ARo is set as the right-side area AR. Therefore, the object TA1 is also selected as the target object. ON capability is improved. In addition, according to the present embodiment, regarding the side in the direction towards the current position of the vehicle 100 from the trajectory straight line ST in relation to the center line CL of the vehicle 100, the application conditions for PCS control are the same as those when the position of the vehicle 100 is on the trajectory straight line ST.

Therefore, PCS control can be prevented from being applied to an object of which the likelihood of collision is low. OFF capability of PCS control can be improved. For example, in state B in FIG. 5, if an area that is the left-side extension area ALe added to the left side of the left-side basic area ALo is set as the left-side area AL, the object TA3 of which the likelihood of collision is not high may be selected as the target object. However, according to the present embodiment, the left-side area AL is set to be the same as the left-side basic area ALo. Therefore, the object TA3 is not selected as the target object. OFF capability is improved.

When the application conditions for PCS control regarding the side opposite to the lateral movement direction of the vehicle 100 is simply relaxed, for example, in state C in FIG. 5, expanding the left-side area AL on the side opposite to the lateral movement direction (rightward direction) from state B, and moving the left-side outer edge of the target area AA to the position of broken line X1 can be considered. However, as described above, in state C, it cannot be said that the possibility of the vehicle 100 subsequently laterally moving to the left side is high. Therefore, when the left-side area AL is extended, PCS control may be applied to the object TA2 of which the likelihood of collision is not high. OFF capability of PCS control decreases. According to the present embodiment, rather than the application conditions for PCS control regarding the side opposite to the lateral movement direction of the vehicle 100 being simply relaxed, the application condition (target area AA) for PCS control is set based on the relationship between the current position of the vehicle 100 and the trajectory straight line ST. Therefore, decrease in OFF capability of PCS control can be suppressed.

In addition, in the present example, the width Le of the right-side extension area ARe and the left-side extension area ALe is set to a value equivalent to the lateral movement amount ΔW. Therefore, the width Le of the right-side extension area ARe and the left-side extension area ALe can be set to a sufficient required value. ON capability and OFF capability of PCS control can both be actualized at an even higher level.

A-3. Calculation Formula for Lateral Movement Amount ΔW

Figure 6:
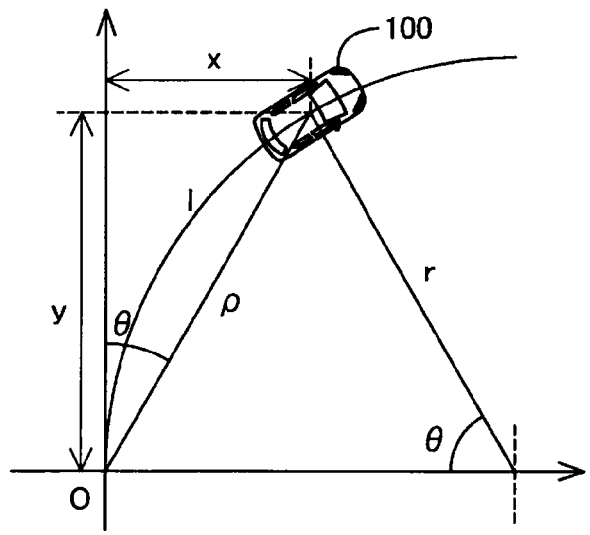
FIG. 6 is an explanatory diagram of a method for deriving a calculation formula for the lateral movement amount ΔW.

As described above, the lateral movement amount ΔW is calculated using above-described expression (1). When the vehicle 100 is in the state shown in FIG. 6, a relationship between circular arc length l and radius r is expressed by expression (2), below.

$$r = l/\theta \qquad (2)$$

When center angle θ is small, the length ρ of the chord can be approximated by expression (3), below. Displacement x and displacement y of the vehicle 100 from the point of origin O can be approximated by expressions (4) and (5), below.

$$\begin{aligned}\rho &= 2r \cdot \sin(\theta/2) \\ &= 2(l/\theta) \cdot \sin(\theta/2) \\ &\cong l\end{aligned} \qquad (3)$$

$$x = \rho \cdot \sin(\theta) \cong \rho \cdot \theta = l \cdot \theta \qquad (4)$$

$$y = \rho \cdot \cos(\theta) \cong \rho = l \qquad (5)$$

Figure 7:
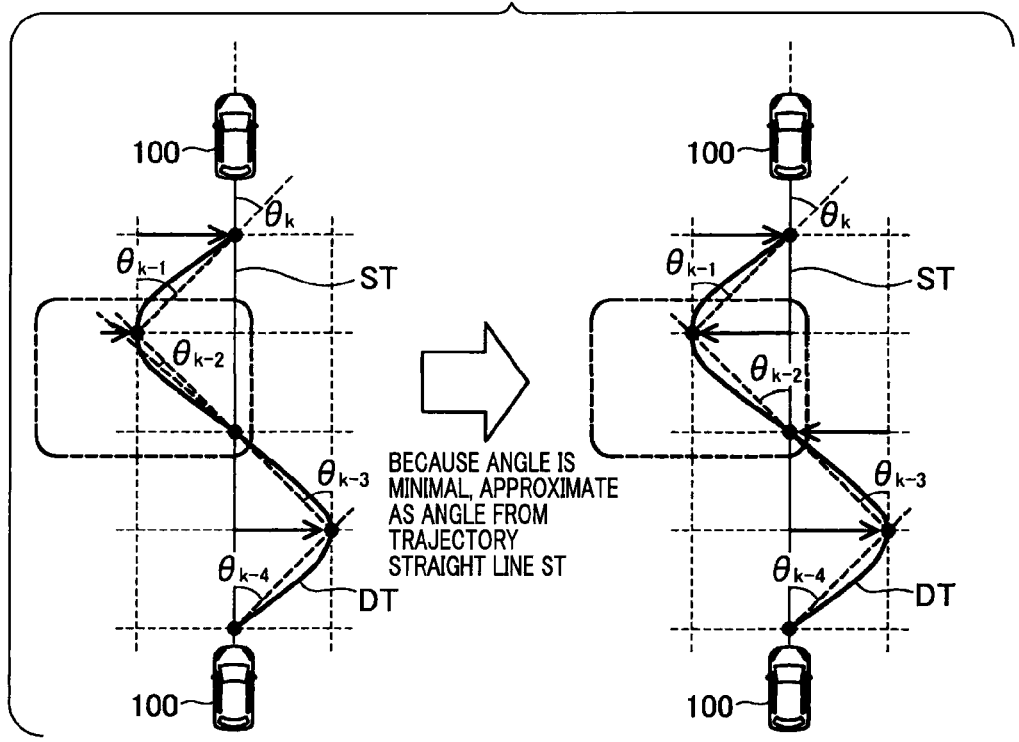
FIG. 7 is an explanatory diagram of a method for deriving a calculation formula for the lateral movement amount ΔW.

When the lateral movement amount ΔW is small enough that the vehicle 100 seems to be in the straight-ahead cruising state, the yaw rate γ is also sufficiently small. Therefore, taking into consideration approximation of angle shown in FIG. 7 as well, the lateral movement amount ΔW in relation to the trajectory straight line ST can be calculated by above-described expression (1).

B. Variation Examples

B-1. First Variation Example

The configuration of the vehicle 100 according to the above-described embodiment is merely an example. Various modifications to the configuration of the vehicle 100 are possible. For example, according to the above-described embodiment, the millimeter-wave radar 11 is used to detect the object ahead of the vehicle 100. However, other sensors, such as a camera, may be used instead of the millimeter-wave radar 11. Alternatively, a plurality of sensors (such as the millimeter-wave radar 11 and a camera) may be used to improve the accuracy of object detection. In addition, according to the above-described embodiment, the driving assistance system ECU 20 includes the PCS control unit 21, the ACC control unit 27, the LKA control unit 28, and the LDW control unit 29. However, the driving assistance system ECU 20 may not include at least one of these control units depending on the type of driving assistance control to be performed.

B-2. Second Variation Example

The types of PCS control given the reference numbers (1) to (7) and described according to the above-described embodiment are merely examples. As PCS control, other types of control may be performed to avoid collision between an object and the vehicle 100 or to reduce impact caused by a collision.

B-3. Third Variation Example

The calculation formula (approximation formula) for the lateral movement amount ΔW according to the above-described embodiment is merely an example. Other formulas may be used to calculate the lateral movement amount ΔW. In addition, the thresholds of the lateral movement amount ΔW and the lateral movement speed dΔW/dt used to determine whether or not the vehicle 100 is in the straight-ahead cruising state can be changed accordingly. In addition, according to the present embodiment, whether or not the vehicle 100 is in the straight-ahead cruising state is determined based on the lateral movement amount ΔW and the lateral movement speed dΔW/dt. However, straight-ahead cruising determination of the vehicle 100 may be performed by other methods. For example, whether or not the vehicle 100 is in the straight-ahead cruising state may be determined using the steering angle of the steering unit 62 or the speed v of the vehicle in place of at least either of the lateral movement amount ΔW and the lateral movement speed dΔW/dt, or together with at least either of the lateral movement amount ΔW and the lateral movement speed dΔW/dt. Alternatively, the position of a boundary (such as a white line) of the cruising lane of the vehicle 100 may be detected by a sensor, such as a camera. Whether or not the cruising lane is for straight-ahead cruising may be determined based on the detected position of the boundary. Whether or not the vehicle 100 is in the straight-ahead cruising state may thereby be determined.

B-4. Fourth Variation Example

According to the above-described embodiment, the width of the target area AA (the target area AA composed of the left-side basic area ALo and the right-side basic area ARo) when the position of the vehicle 100 is on the trajectory straight line ST is substantially the same as the width of the vehicle 100. However, the width of the target area AA may be wider than the width of the vehicle 100. Alternatively, the width of the target area AA may be slightly narrower than the width of the vehicle 100. In addition, according to the present embodiment, the width Le of the right-side extension area ARe (or the left-side extension area ALe) is set to be equivalent to the lateral movement amount ΔW. However, the width Le of the right-side extension area ARe (or the left-side extension area ALe) is not necessarily limited thereto. The width Le of the right-side extension area ARe (or the left-side extension area ALe) may be set to a value obtained by the lateral movement amount ΔW being multiplied by a predetermined coefficient. Alternatively, the width Le of the right-side extension area ARe (or the left-side extension area ALe) may be set independently from the lateral movement amount ΔW.

In addition, according to the above-described embodiment, regarding the side in the direction towards the current position of the vehicle 100 from the trajectory straight line ST in relation to the center line CL of the vehicle 100 (such as the left side in relation to the center line CL in state B in FIG. 5), the same area as that when the position of the vehicle 100 is on the trajectory straight line ST is set as the area composing the target area AA. However, the same area is not necessarily required to be set. The area may be set accordingly based on the required ON capability and OFF capability.

B-5. Fifth Variation Example

According to the above-described embodiment, when that the vehicle 100 is determined not to be in the straight-ahead cruising state, the non-straight-ahead cruising control process (Step S200 in FIG. 3) is performed. However, PCS control may not be performed in such instances.

B-6. Sixth Variation Example

Figure 8:
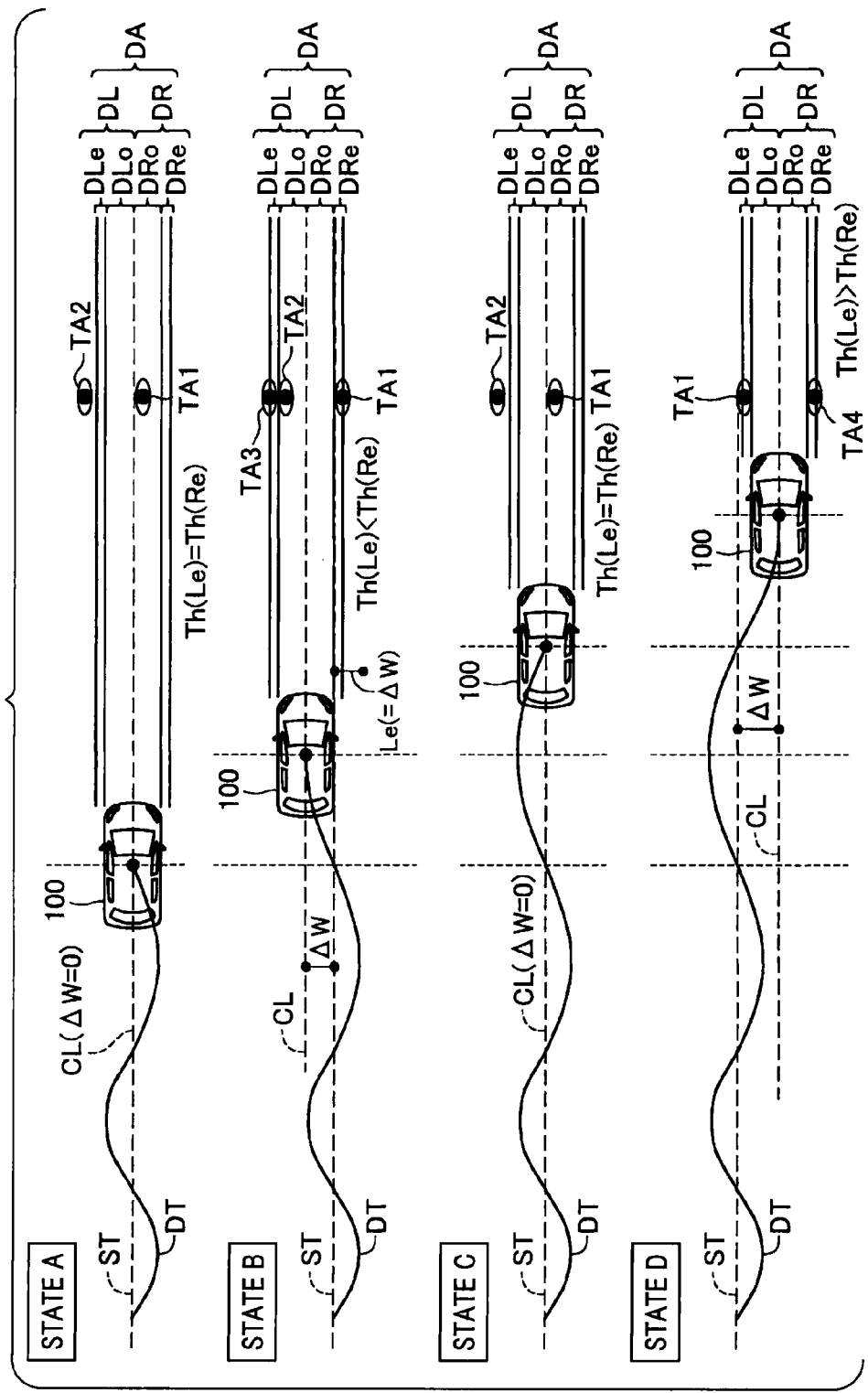
FIG. 8 is an explanatory diagram of a method for setting a threshold for a time-to-collision TTC based on the cruising trajectory in a variation example.

According to the above-described embodiment, the target area AA is variable depending on the relationship between the current position of the vehicle 100 and the trajectory straight line ST. However, as shown in FIG. 8, the threshold of the time-to-collision TTC may be made variable instead of the target area AA. In FIG. 8, in a manner similar to that in FIG. 5, a movement history (from state A to state D) of the vehicle 100 is shown. In the variation example shown in FIG. 8, a target area DA (equivalent to the target area AA in FIG. 5) is the same in all states. In other words, regardless of the current position of the vehicle 100 being on the trajectory straight line ST or not, the target area DA is composed of a left-side area DL and a right-side area DR. The left-side area DL is composed of a left-side basic area DLo and a left-side extension area DLe. The right-side area DR is composed of a right-side basic area DRo and a right-side extension area DRe. The width of the area composed of the left-side basic area DLo and the right-side basic area DRo is substantially the same as the width of the vehicle 100.

In the variation example shown in FIG. 8, when the current position of the vehicle 100 is on the trajectory straight line ST as in state A and state C, a threshold Th(Le) of the time-to-collision TTC applied to an object detected in the left-side extension area DLe is the same as a threshold Th(Re) of the time-to-collision TTC applied to an object detected in the right-side extension area DRe. On the other hand, when the current position of the vehicle 100 is to the left of the trajectory straight line ST as in state B, the threshold Th(Re) for the right-side extension area DRe is greater than the threshold Th(Le) for the left-side extension area DLe. In other words, the application condition for PCS control on the right side is more relaxed than that for the left side. The difference between the threshold Th(Re) and the threshold Th(Le) may be a fixed value. Alternatively, the threshold Th(Re) and the threshold Th(Le) may be calculated so that the difference becomes greater as the lateral movement amount ΔW increases. In a similar manner, when the current position of the vehicle 100 is to the right of the trajectory straight line ST as in state D, the threshold Th(Le) for the left-side extension area DLe is greater than the threshold Th(Re) for the right-side extension area DRe. In other words, the application condition for PCS control on the left side is more relaxed than that for the right side. In this way, even when the threshold of the time-to-collision TTC is made variable instead of the target area DA, when the position of the vehicle 100 is not on the trajectory straight line ST, the application condition for PCS control can be set to be more relaxed for the opposite side, compared to the side in the direction towards the current position of the vehicle 100 from the trajectory straight line ST in relation to the center line CL of the vehicle 100. As a result, ON capability and OFF capability of PCS control can both be achieved at a high level.

B-7. Seventh Variation Example

Figure 9:
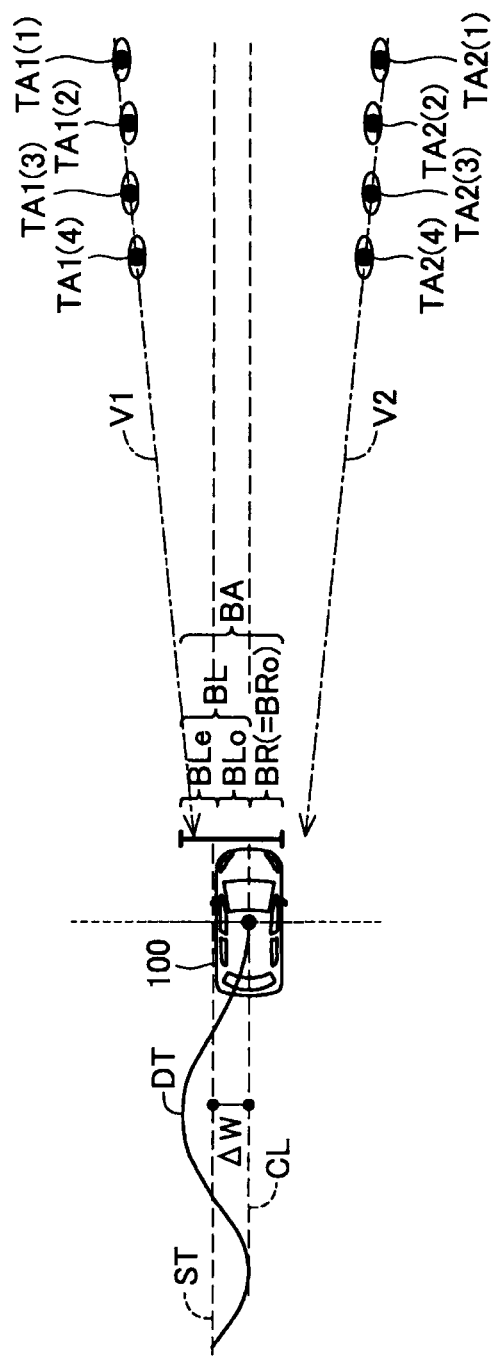
FIG. 9 is an explanatory diagram of a method for setting a target area BA based on the cruising trajectory in a variation example.

According to the present embodiment, as the application conditions for PCS control, a condition that an object is detected in the target area AA is used. In addition, a condition that the time-to-collision TTC regarding the detected object is shorter than the first threshold Th1 is used. However, the application conditions for PCS control are not limited thereto. For example, as shown in FIG. 9, a movement vector V of an object TA detected based on the history of the position of the object TA intersecting with a target area BA set ahead of the vehicle 100 may be used as the application condition for PCS control. In this instance, the target area BA is a plane that is perpendicular to the trajectory straight line ST. The position of the target area BA along the trajectory straight line ST is near the front end of the vehicle 100. "The movement vector V intersects with the target area BA" can be said to be a condition related to a future predicted positional relationship between an object and the vehicle 100.

In a manner similar to the target area AA according to the above-described embodiment, the target area BA in the present variation example is composed of a left-side area BL and a right-side area BR. When the current position of the vehicle 100 is on the trajectory straight line ST, the width of the left-side area BL (left-side basic area BLo) and the width of the right-side area BR (right-side basic area BRo) are the same. As shown in FIG. 9, when the current position of the vehicle 100 is not on the trajectory straight line ST, regarding the side in the direction towards the current position of the vehicle 100 from the trajectory straight line ST in relation to the center line CL of the vehicle 100 (the right side in relation to the center line CL in FIG. 9), the right-side area BR is the same as the right-side basic area BRo. On the other hand, regarding the opposite side in relation to the center line CL of the vehicle 100 (the left side in relation to the center line CL in FIG. 9), an area that is a left-side extension area BLe added to the left-side basic area BLo is set as the left-side area BL.

Therefore, in the variation example, when the position of the vehicle 100 is not on the trajectory straight line ST, the application condition for PCS control is set to be more relaxed for the opposite side, compared to the side in the direction towards the current position of the vehicle 100 from the trajectory straight line ST in relation to the center line CL of the vehicle 100. For example, the movement vector V1 of the object TA1 of which the position changes in order from TA1(1) to TA1(2) to TA1(3) to TA1(4) intersects with the target area BA (the left-side extension area BLe within the target area BA). Therefore, if the condition related to the time-to-collision TTC is met, PCS control is applied to the object TA1. On the other hand, the movement vector V2 of the object TA2 of which the position changes in order from TA2(1) to TA2(2) to TA2(3) to TA2(4) does not intersect with the target area BA. Therefore, PCS control is not applied to the object TA2. In this way, even when the application condition for PCS control that the movement vector V of the object TA intersects with the target area BA is used, when the position of the vehicle 100 is not on the trajectory straight line ST, the application condition for PCS control can be set to be more relaxed for the opposite side, compared to the side in the direction towards the current position of the vehicle 100 from the trajectory straight line ST in relation to the center line CL of the vehicle 100. As a result, ON capability and OFF capability of PCS control can both be achieved at a high level.

B-8. Eighth Variation Example

When the position of the vehicle 100 is not on the trajectory straight line ST, the application conditions for PCS control may be set to be more relaxed for the opposite side, compared to the side in the direction towards the current position of the vehicle 100 from the trajectory straight line ST in relation to the center line CL of the vehicle 100, not only regarding the application conditions for PCS control used in the above-described embodiment and the variation examples shown in FIG. 8 and FIG. 9, but also when any condition is used. As a result, ON capability and OFF capability of PCS control can both be achieved at a high level. Furthermore, in addition to such aspects, the application conditions for PCS control can be set to differ between conditions applied to the left side in relation to the center line CL of the vehicle 100 and conditions applied to the right side, based on the cruising trajectory of the vehicle 100. As a result, even when the vehicle 100 is in the apparent straight-ahead cruising state, conditions enabling PCS control to be appropriately applied can be set. The capabilities of PCS control can be improved.

In addition, the present invention can be applied to other types of vehicle control, in addition to PCS control. Here, vehicle control is that in which a target object that meets predetermined conditions related to at least either of the current positional relationship or future predicted positional relationship with the vehicle 100, among objects ahead of the vehicle 100, is detected. The vehicle 100 is then made to perform a predetermined operation related to the detected target object. The other types of vehicle control include ACC control, LKA control, LDW control, and the like. In other words, the present invention can be applied to condition setting for detection of a preceding vehicle in ACC control. In addition, the present invention can be applied to condition setting for detection of a lane boundary (such as a white line) in LKA control and LDW control. In these other types of vehicle control as well, when the vehicle is determined to be in the straight-ahead cruising state, the conditions applied to the left side in relation to the center line CL of the vehicle 100 and the conditions applied to the right side may be set to differ, based on the cruising trajectory of the vehicle 100. As a result, conditions can be set so that control of the vehicle 100 is appropriately performed even when the vehicle 100 is in the apparent straight-ahead cruising state. Control capabilities for the vehicle 100 can be improved.

In addition, the present invention is not limited to the above-described embodiment and the variation examples. The present invention can be actualized using various configurations without departing from the spirit of the present invention. For example, technical features in the embodiments, examples, and variation examples corresponding to the technical features in each aspect described in the Summary of the Invention can be switched or combined accordingly to solve some or all of the above-described issues or to achieve some or all of the above-described effects. In addition, unless a technical feature is described as being an essential feature in the present specification, the technical features can be omitted as appropriate.

What is claimed is:

1. A vehicle control apparatus comprising:
    a control unit including a processor, the control unit being configured to:
        acquire a yaw rate of a vehicle from a yaw rate sensor;
        determine whether or not the vehicle is traveling in a straight-ahead cruising state based on the acquired yaw rate;
        detect a target object that meets at least a predetermined condition related to a current positional relationship with the vehicle, among objects ahead of the vehicle, when the vehicle is determined to be traveling in the straight-ahead cruising state;
        set a condition to be applied to a left side in relation to a center line of the vehicle to differ from a condition to be applied to a right side, based on a cruising trajectory of the vehicle, the control unit being further configured to set the at least the predetermined condition related to the current positional relationship so that, when a current position of the vehicle is not on a trajectory straight line that approximates a past cruising trajectory of the vehicle, as compared to a first condition that is a condition to be applied to a side in a direction towards the current position of the vehicle from the trajectory straight line in relation to the center line of the vehicle, a second condition that is a condition applied to an opposite side in relation to the center line of the vehicle is more frequently met by the objects; and
        control the vehicle to perform a predetermined operation related to the detected target object, including control of at least one of a throttle system, a brake system, and a steering system of the vehicle, based on the at least the predetermined condition related to the current positional relationship with the vehicle.

2. The vehicle control apparatus according to claim 1, wherein:
    the first condition is consistent with a basic condition defined as the at least the predetermined condition given when the current position of the vehicle is on the trajectory straight line, and
    the second condition is more relaxed than the basic condition so that the second condition is more frequently met by the objects.

3. The vehicle control apparatus according to claim 2, wherein:
    the control unit is further configured to determine a relaxation degree of the second condition to the basic condition based on a distance between the trajectory straight line and the current position of the vehicle.

4. The vehicle control apparatus according to claim 3, wherein:
    the control unit is configured to memorize information indicative of running of the vehicle during a given period of time in the past and calculate the trajectory straight line.

5. The vehicle control apparatus according to claim 4, wherein:
    the at least the predetermined condition includes a condition showing that a future predicted positional relationship which is provided between the objects and the vehicle is a relationship showing a higher probability of a collision between the objects and the vehicle, and
    the predetermined operation includes at least one of an operation for avoiding the collision and an operation for reducing impact occurring due to the collision.

6. The vehicle control apparatus according to claim 2, wherein:
    the control unit is further configured to memorize information indicative of running of the vehicle during a given period of time in the past and calculate the trajectory straight line.

7. The vehicle control apparatus according to claim 6, wherein:
    the at least the predetermined condition includes a condition showing that a future predicted positional relationship which are provided between the objects and the vehicle is a relationship showing a higher probability of a collision between the objects and the vehicle, and
the predetermined operation includes at least one of an operation for avoiding the collision and an operation for reducing impact occurring due to the collision.

8. The vehicle control apparatus according to claim 1, wherein:
the control unit is further configured to memorize information indicative of running of the vehicle during a given period of time in the past and calculate the trajectory straight line.

9. The vehicle control apparatus according to claim 8, wherein:
the at least the predetermined condition includes a condition showing that a future predicted positional relationship which is provided between the objects and the vehicle is a relationship showing a higher probability of a collision between the objects and the vehicle, and
the predetermined operation includes at least one of an operation for avoiding the collision and an operation for reducing impact occurring due to the collision.

10. The vehicle control apparatus according to claim 1, wherein:
the at least the predetermined condition includes a condition showing that a future predicted positional relationship which is provided between the objects and the vehicle is a relationship showing a higher probability of a collision between the objects and the vehicle, and
the predetermined operation includes at least one of an operation for avoiding the collision and an operation for reducing impact occurring due to the collision.

11. A vehicle provided with a vehicle control apparatus comprising:
a control unit including a processor, the control unit being configured to:
acquire a yaw rate of a vehicle from a yaw rate sensor;
determine whether or not the vehicle is traveling in a straight-ahead cruising state based on the acquired yaw rate;
detect a target object that meets at least a predetermined condition related to a current positional relationship with the vehicle, among objects ahead of the vehicle, when the vehicle is determined to be traveling in the straight-ahead cruising state;
set a condition to be applied to a left side in relation to a center line of the vehicle to differ from the a condition to be applied to the a right side, based on a cruising trajectory of the vehicle, the control unit being further configured to set the at least the predetermined condition related to the current positional relationship so that, when a current position of the vehicle is not on a trajectory straight line that approximates a past cruising trajectory of the vehicle, as compared to a first condition that is a condition to be applied to a side in a direction towards the current position of the vehicle from the trajectory straight line in relation to the center line of the vehicle, a second condition that is a condition applied to an opposite side in relation to the center line of the vehicle is more frequently met by the objects; and
control the vehicle to perform a predetermined operation related to the detected target object, including control of at least one of a throttle system, a brake system, and a steering system of the vehicle, based on the condition at least the predetermined condition related to the current positional relationship with the vehicle.

12. A vehicle control apparatus comprising:
a control unit including a processor, the control unit being configured to:
acquire a yaw rate of a vehicle from a yaw rate sensor;
determine whether or not the vehicle is traveling in a straight-ahead cruising state, including a state where the vehicle is regarded as cruising straight, based on the acquired yaw rate;
detect a target object that meets at least a predetermined condition related to a current positional relationship with the vehicle, among objects ahead of the vehicle;
set a condition, the condition being different between a state where the vehicle is traveling in the straight-ahead cruising state and a state where the vehicle is not traveling in the straight-ahead cruising state;
set the at least the predetermined condition related to the current positional relationship so that the condition when the vehicle is not traveling in the straight-ahead cruising state is more frequently met by the objects; and
control the vehicle to perform a predetermined operation related to the detected target object, including control of at least one of a throttle system, a brake system, and a steering system of the vehicle, based on the at least the predetermined condition related to the current positional relationship with the vehicle.

13. A vehicle control apparatus comprising:
a control unit including a processor, the control unit being configured to:
acquire a yaw rate of a vehicle from a yaw rate sensor;
determine whether or not the vehicle is traveling in a straight-ahead cruising state based on the acquired yaw rate;
detect a target object that meets at least a predetermined condition related to a current positional relationship with the vehicle, among objects ahead of the vehicle, when the vehicle is determined to be traveling in the straight-ahead cruising state;
set a condition to be applied to a left side in relation to a center line of the vehicle to differ from a condition to be applied to a right side, based on a cruising trajectory of the vehicle; and
control the vehicle to perform a predetermined operation related to the detected target object, including control of at least one of a throttle system, a brake system, and a steering system of the vehicle, based on the at least the predetermined condition related to the current positional relationship with the vehicle;
wherein the control unit is further configured to:
calculate a trajectory straight line that approximates a past cruising trajectory of the vehicle;
compare a current position of the vehicle and the trajectory straight line; and
when the current position of the vehicle is not on the trajectory straight line that approximates a past cruising trajectory of the vehicle, set a second condition so that, as compared to a first condition that is a condition to be applied to a side in a direction towards the current position of the vehicle from the trajectory straight line in relation to the center line of the vehicle, the second condition that is a condition applied to an opposite side in relation to the center line of the vehicle is more frequently met by the objects.

14. The vehicle control apparatus according to claim 13, wherein the control unit is configured to compare the current position of the vehicle and the trajectory straight line, and when the current position of the vehicle is on the trajectory straight line, set the first and second conditions to be equal to each other.

15. A vehicle control apparatus comprising:
a control unit including a processor, the control unit being configured to:
  acquire a yaw rate of a vehicle from a yaw rate sensor;
  determine whether or not the vehicle is traveling in a straight-ahead cruising state based on the acquired yaw rate;
  detect a target object that meets at least a predetermined condition related to a current positional relationship with the vehicle, among objects ahead of the vehicle, when the vehicle is determined to be traveling in the straight-ahead cruising state;
wherein the control unit is further configured to:
  only when the vehicle is traveling in the straight-ahead cruising state, set a condition to be applied to a left side in relation to a center line of the vehicle to differ from a condition to be applied to a right side, based on a cruising trajectory of the vehicle,
  set the at least the predetermined condition related to the current positional relationship so that a condition when the vehicle is not traveling in the straight-ahead cruising state is more frequently met by the objects, and
  control the vehicle to perform a predetermined operation related to the detected target object, including control of at least one of a throttle system, a brake system, and a steering system of the vehicle based on the at least the predetermined condition related to the current positional relationship with the vehicle.

* * * * *